United States Patent [19]
Betts

[11] Patent Number: 5,035,669
[45] Date of Patent: Jul. 30, 1991

[54] CUTTER CAM ADJUSTMENT ASSEMBLY

[75] Inventor: Edmund D. Betts, Libertyville, Ill.

[73] Assignee: Gregor Jonsson Associates, Inc., Highland Park, Ill.

[21] Appl. No.: 524,631

[22] Filed: May 16, 1990

[51] Int. Cl.[5] ............................................. A22C 29/02
[52] U.S. Cl. ............................................ 452/5; 452/3
[58] Field of Search ................................ 452/5, 3, 2, 1

[56] References Cited

U.S. PATENT DOCUMENTS

| | | | |
|---|---|---|---|
| 3,751,766 | 8/1973 | Jonsson | 452/5 |
| 4,210,982 | 7/1980 | Hoffman et al. | 452/3 |
| 4,393,544 | 7/1983 | Lapeyre et al. | 452/5 |
| 4,472,858 | 9/1984 | Keith | 452/3 |
| 4,769,871 | 9/1988 | Betts | 452/5 |

Primary Examiner—Willis Little
Attorney, Agent, or Firm—Marshall, O'Toole, Gerstein, Murray & Bicknell

[57] ABSTRACT

A cam adjusting assembly for a rotary cutter blade in a shrimp peeling machine. The assembly includes a retention member disposed for movement in a slot in a retention gear with a cam means being selectively positioned along the length of the slot and maintained in a desired position by a biasing means which connects the cam member to the retention member thereby permitting the shrimp cutting blade to be adjusted as to the location where the blade enters a shrimp to be cut.

28 Claims, 9 Drawing Sheets

CUTTER CAM ADJUSTMENT ASSEMBLY

FIELD OF INVENTION

The invention disclosed and claimed herein relates to a cutting blade adjustment assembly for a shrimp peeling device; and, more particularly, to a cam actuated device for adjusting the location where a cutter blade enters a shrimp whose shell is to be cut.

BACKGROUND OF THE INVENTION

Various production machines presently are available in the shrimp processing industry for processing shrimp. Illustrative of conventional production machines are U.S. Pat. No. 4,769,871, 4,507,825 and 3,751,766, the disclosures, including specification and drawings, of which are incorporated by reference herein. Generally, four or six clamping stations are located on a rotary turret wheel. A shrimp is deposited in a clamp assembly which comprises two components, one of which grips the shrimp body while the remaining component grips the shrimp tail. Once clamped in position, the assembly is rotated past a cutting station where a rotary cutting blade cuts the shrimp shell and meat body along the entire or substantial length or longitudinal axis of the shrimp to expose the shrimp sand vein.

Following the cutting operation, the clamp assembly is rotated to another work station where a brush assembly serves to rake debris from the sand vein area. At a subsequent work station, a plurality of spikes or tines positioned adjacent the clamp assembly are actuated and penetrate the shrimp meat which is exposed following the cutting of the shrimp shell. The spikes coact with the revolving clamp means, which continue to grip the shrimp, and separate the shrimp meat from the shell. Following separation, the spikes or tines are retracted from the meat and the meat is transported to a collecting station while the shell is transported to a further work station where, ultimately, it is released from the clamp assembly and passes into a discharge container.

Shrimp consisting of the flesh body to which the shrimp tail remains attached and from which the sand vein and main portion of the shrimp shell has been removed is referred to in the trade as "tail-on" shrimp. Shrimp which have the shrimp tail removed from the flesh body during the course of processing the shrimp are referred to as "tail-off" shrimp.

Depending upon whether a shrimp is to be a "tail-on" or "tail-off" style dictates where the knife blade enters the shrimp during a cutting operation. For a "tail-off" shrimp, the blade is set to cut along the entire length or longitudinal axis of the shrimp. If a "tail-on" shrimp is desired, the rotary knife blade does not enter the shrimp at the tail section; but, rather, the blade is adjusted relative to a clamp assembly so that only a portion of the shrimp shell is cut.

The mechanism presently available for adjusting the location where a rotary knife blade enters a shrimp for either a "tail-on" or "tail-off" style employs a cam follower which follows a cam path generated by a cam attached to a gear member. The cam follower is connected to a pivotable arm to which the cutter blade is also attached. As the cam follower travels over the cam path, the knife blade will travel a corresponding path which dictates where the knife will enter a shrimp. The cam is adapted to be adjusted to take into account the size of a shrimp to be cut and whether the shrimp is to be processed as "tail-off" or "tail-on."

It has been found that the system for converting a cam assembly from a "tail-on" to a "tail-off" style or otherwise adjusting the cam assembly is not entirely satisfactory in all instances. To provide the appropriate cam adjustment with the system presently available, a retaining pin is removed and a retention gear having the cam fixedly attached thereto is withdrawn from meshing engagement with a corresponding drive gear to a position where the retention gear is adapted to rotate freely. The retention gear then is rotated a distance of one, two, three or more teeth depending upon the size of the shrimp being processed, following which the retention gear is placed back into meshing relationship with the drive gear and the locking hardware is reinserted. Rotation of the retention gear having the cam fixedly attached thereto by movement of several teeth relative to the drive gear serves to alter the cam path when the machine is subsequently actuated so that the rotary cutting blade will travel in an altered path and provided the desired "tail-on" style shrimp.

Similarly, when it is desired to have a "tail-off" style shrimp, the retention gear is rotated some ten or eleven teeth relative to the drive gear following which the retention gear is meshed again with the drive gear. In this adjusted position, the cam permits the rotary blade to cut a shrimp along its entire length.

Unfortunately, the present cam adjusting system suffers from several attendant disadvantages. It has been found that when an operator removes the retention gear from its meshing relationship with the drive gear and rotates it to a desired position, he or she will sometimes forget the number of teeth the gear is rotated. As a result, an operator sometimes becomes confused in the course of an adjusting operation, the effect of which is to generate an erroneous cam follower path. Further, it has been found that the carrying out of the present cam adjustment system, even when performed correctly, involves an inordinate amount of time for the normal operator. In other instances, operators have found the present cam adjustment system to be too difficult and tedious. Additionally, irrespective of what style shrimp is desired, i.e., "tail-off" or "tail-on," adjustment by way of moving the retention gear a finite number of teeth relative to the drive gear is always required. Moreover, it has been found that, in some instances, where an operator perceives the adjusting system to be either too slow, complex or tedious, the operator simply does not perform the necessary cam adjustment which results in the wrong style shrimp being processed.

FInally, when the present cam adjustment system is set for "tail-off" style processing, the cam rotates unnecessarily and causes the cam follower to travel over the cam path unnecessarily, which, in turn, causes the pivotable arm to which the cutter blade is attached to travel unnecessarily over a corresponding path. All this unnecessary travel results in excess wear and tear on these moving parts.

What is desired is to have a means for easily adjusting the position where the shrimp cutting knife or blade will enter the shrimp for either a "tail-on" or "tail-off" style and also for taking into account the particular size of shrimp to be cut. It is also desired that the cam adjustment be accomplished in a relatively short period of time. Further, it is desired to have a knife adjusting system which is more efficient and reliable than the adjusting system presently available. Moreover, it is desired to have a relatively simple knife blade adjusting system whereby an operator of ordinary skill can relatively quickly and easily adjust the location where a cutter blade or knife enters a shrimp to achieve a desired shrimp style. Finally, it is desired to have an adjusting system wherein the cam member can be readily placed in an inoperative position when a "tail-off" style shrimp is being processed, such that unnecessary travel of the cam follower and the resulting wear can be avoided.

SUMMARY OF THE PRESENT INVENTION

The invention disclosed and claimed herein serves to minimize the problems found with the above-referenced cam adjusting system presently available and, at the same time, achieve the desires sought with respect to adjusting the path of travel of a knife blade for a "tail-on" or "tail-off" style shrimp.

Briefly, the knife blade adjusting means of the present invention comprises a retention gear fixedly disposed on a shaft. The retention gear has an arcuate-shaped slot in which a free-floating cam retention member is disposed for movement along the length of the slot. A cam member is loosely connected to the shaft and moves independently thereof. The cam also is adapted to move a short distance along the longitudinal axis of the shaft. A spring biased locking member serves to releasably connect the cam to the free-floating retention member which is located at a desired position in the slot. Accordingly, the cam member is adapted to be adjustably positioned relative to the slot, the effect of which is that each adjusted position will generate a different path of travel for a cam follower to which a rotary knife blade is connected. Upon actuation of the shrimp peeling machine, the cam follower follows the desired path generated by the cam, the effect of which is the rotary blade will enter a particular size shrimp at a desired position to provide a "tail-on" style of shrimp, or cut along the entire length of a shrimp to provide a "tail-off" style of shrimp.

In the event a "tail-off" style of shrimp is to be processed for an extended period of time such as a full day or several full days, then, an operator need only unfasten a locking member which disconnects the cam and free-floating retention member whereby the cam pivots about the shaft and drops to an inoperative position relative to the cam follower whereby the knife blade is adapted to cut along the entire length of a shrimp located in a clamp assembly to achieve a "tail-off" style and avoid unnecessary wear in the pivotable arm to which the knife blade is attached.

The adjustment of the cam adjusting means to provide a "tail-on" or "tail-off" style can be accomplished in a relatively easy and simple operation; and, in the instance when a "tail-off" style shrimp is being processed for a long period, the cam member can readily be rendered inoperative.

These and other advantages will become more apparent from a further understanding of the drawings and detailed description.

DETAILED DESCRIPTION

Figure 1:
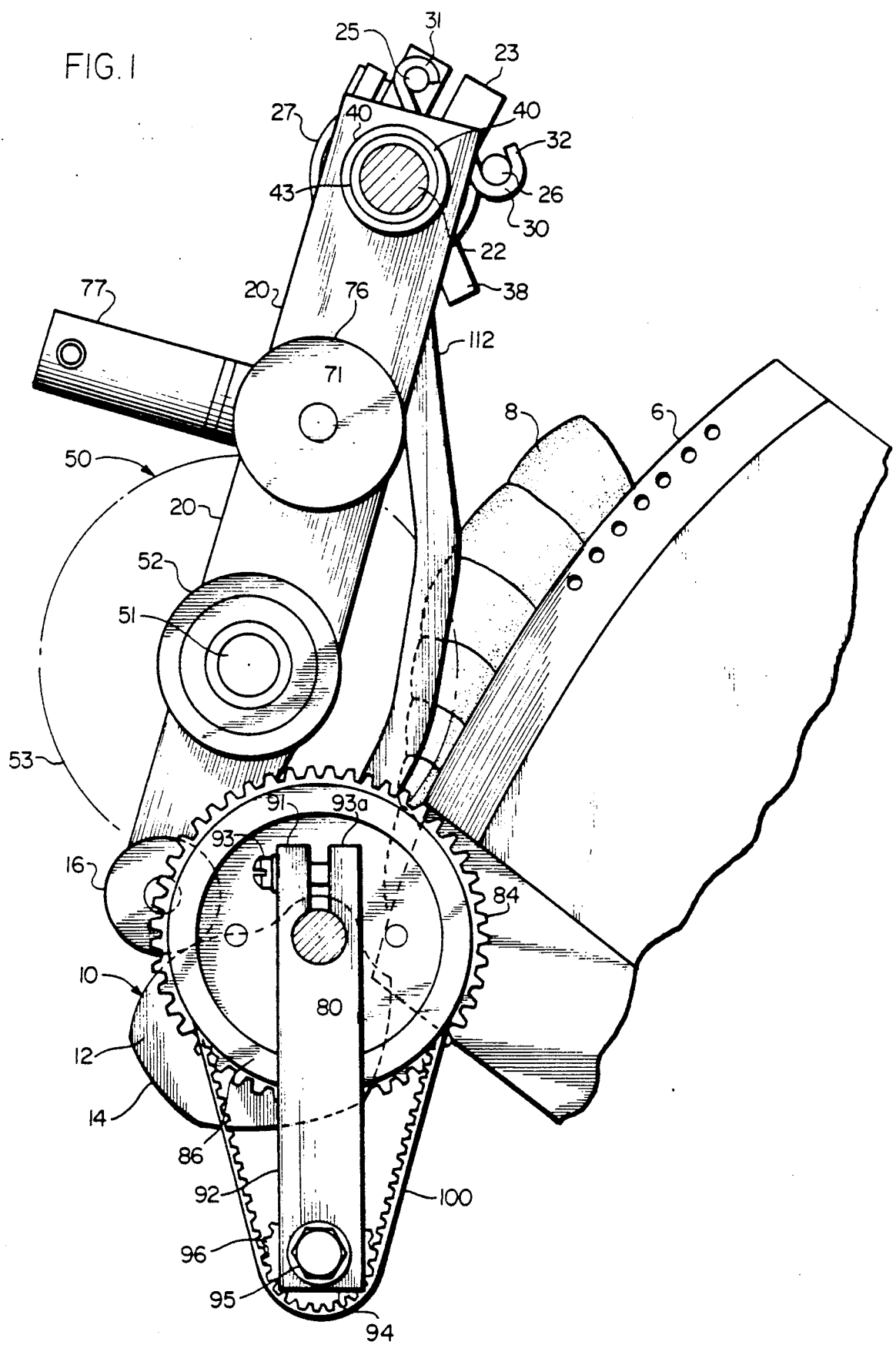
FIG. 1 shows a partial view of the cam adjusting device of the present invention with a rotary cutter blade entering a shrimp disposed on a clamp assembly positioned on a rotatable turret wheel.

Referring to the drawings, FIG. 1 shows a cutting blade cam adjusting device 10 which includes a cam 12 having a cam surface 14 upon which cam follower 16 is adapted to travel. Cam 112 is adapted to rotate relative to follower 16 which is attached to a pivotable arm 20. A cutter assembly is also disposed on arm 20 and the details of the cutter assembly and cam follower are disclosed in U.S. Pat. No. 4,472,858, the specification and drawings of which are incorporated herein by reference.

Referring to the cutter assembly, shaft 22 is fixed to suitable frame supports (now shown). A block 23 is clamped to shaft 22 by suitable screw means, not shown. A first anchor stud 25 extends outward from clamp block 23. A second anchor stud 26 extends outward from or is fixed to bearing bushing 27 which is rotatable about shaft 22. Torsion spring 30 has one end 31 attached to the first anchor stud 25 while the remaining spring end 32 is attached to the second anchor stud 26, thereby serving as spring means for biasing bushing 27 on shaft 22. A first stop collar, not shown, is keyed to shaft 22 and is held in fixed position by a suitable fastening screw. A guide bar stop 38 is fixed to and depends from the collar.

Bearing bushing 40, which is rotatable about shaft 22, is fixed at one end to rotatable arm 20 which extends radially from shaft 22. Washer 43 is positioned adjacent one end of bushing 40 while another washer is located adjacent arm 20. A collar means serves to position arm 20 in a fixed position on shaft 22. The specific details of the collar fastening means are disclosed in U.S. Pat. No. 4,472,858.

Cutting assembly 50 is connected to arm 20. Rotatable shaft 51 passes through a first bushing sleeve disposed in a bore in arm 20. The details and operation of the cutting assembly are disclosed in the '858 patent previously incorporated herein by reference. A pulley 52 is fixed to shaft 51 and a belt, not shown, connects pulley 52 to another pulley spaced therefrom and located on another drive shaft, now shown. Rotation of shaft 51 causes rotation of rotary cutting blade 53 which is removably fastened to shaft 51.

The rotary cutter blade 53 extends through a shrimp guide bar 112 which is fixed at one end to bearing support bushing 27.

A knurled adjustment knob 76 is fixed by suitable fastening means to cam support shaft 71. Rotation of knob 76 causes rotation of shaft 71 and a cam member, not shown, which serves to assist in controlling the distance cutting blade 53 extends through guide bar 112.

A tee handle 77 is connected to a yoke device, not shown. When handle 77 is turned, the yoke device serves to lock the guide bar cam adjusting means in position.

What has been described to this point is known and utilized in conventional shrimp peeling machines and is described in more detail in U.S. Pat. No. 4,472,858. Reference to the '858 patent will disclose the specific details of the cutting and guide bar assemblies 50 and 112.

Figure 5:
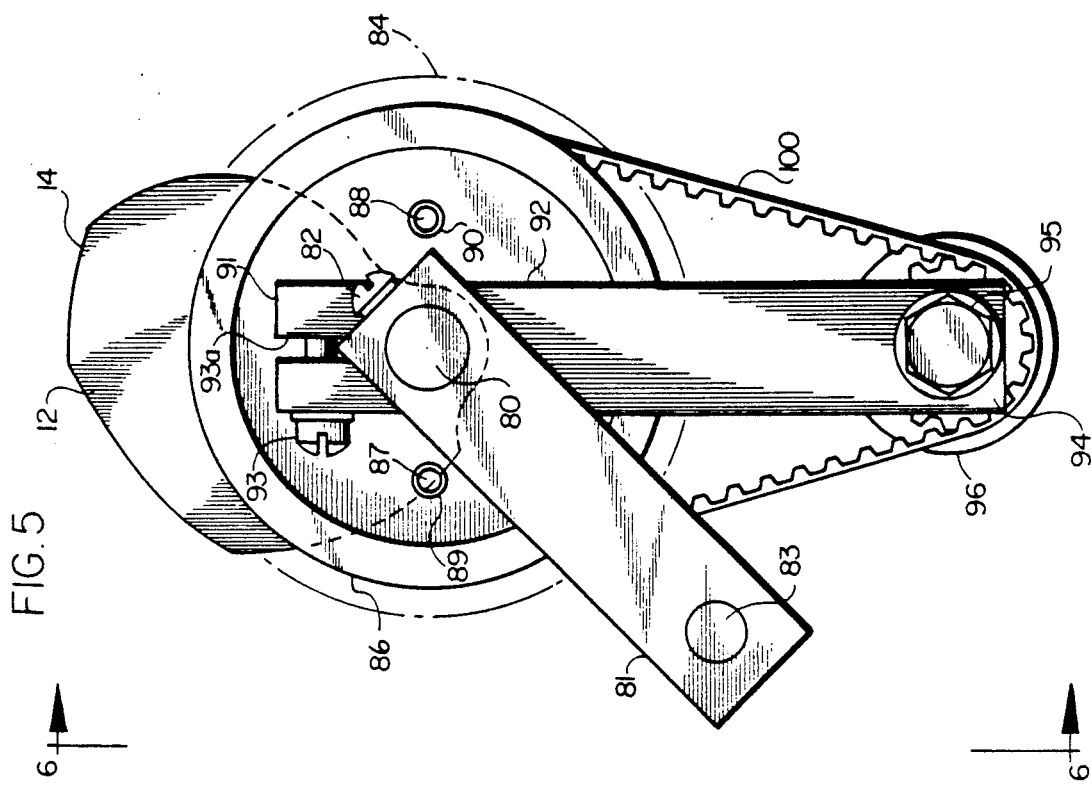
FIG. 5 shows a side view of the cam adjusting device of the present invention.
Figure 6:
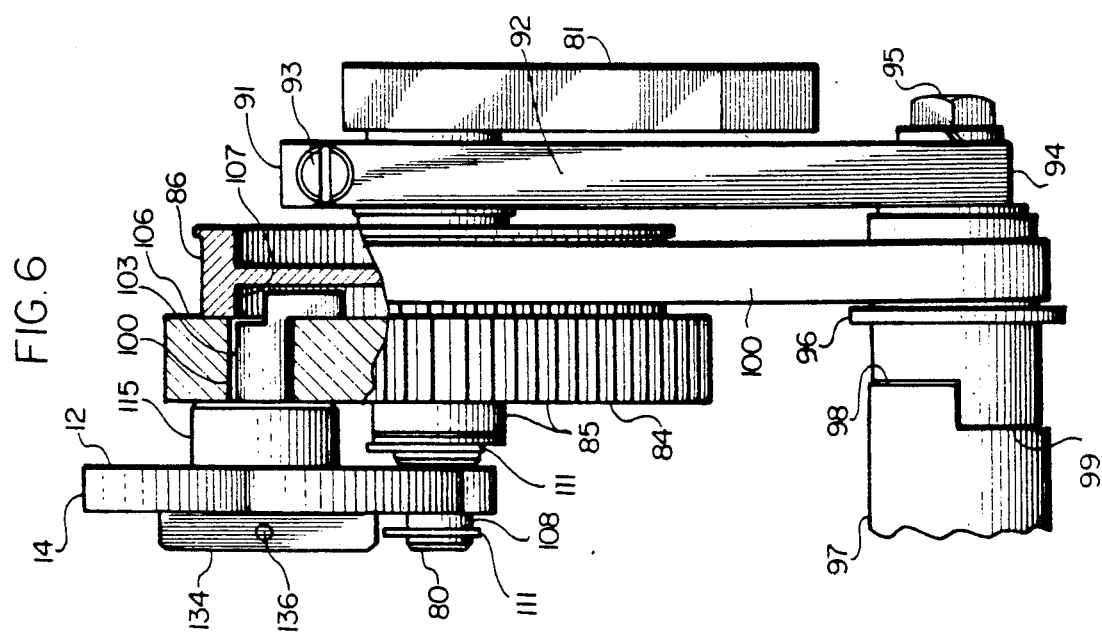
FIG. 6 shows a partial front view taken along lines 6—6 in FIG. 5 of the cutter blade cam adjusting device of the present invention.

Turning to FIGS. 1, 5 and 6, there is shown a shaft 80. Block member 81 having a yoke-like closure at one end is adapted to be fastened to shaft 80 and retained thereon by means of a conventional threaded fastener means 82. Block member 81 has an opening 83 at its outboard end which is adapted to receive a fastener for removably attaching the block to a machine frame member or post.

Retention gear 84 has an integral hub 85 located on one side of the gear. Gear 84 is rotatably disposed on shaft 80. A second gear member 86 also is rotatably disposed on shaft 80 and is fixedly connected to the remaining side of gear 84 by means of retention pins 87, 88 which project outward from a side or gear 84 into corresponding openings 89, 90 in second gear member 86 whereby gears 84 and 86 rotate together about shaft 80.

One end 91 of arm member 92 is fixedly disposed to shaft 80 by means of fastening screw 93 which draws the end of a yoke-type closure together at 93a.

A fastener having a shaft 95 is mounted in a suitable opening at end 94 of arm member 92. Pulley 96 is seated for rotation on shaft 95. Rotatable bushing 97 also is seated on shaft 95 and has one end 98 which meshes with one end 99 of pulley 96.

A brush assembly, not shown, is adapted to seat on bushing 97. The brush assembly serves to devein shrimp 8 located in a clamp assembly 6. The deveining follows a cutting operation on shrimp 8 by rotary cutting blade 50.

The brush assembly adapted to seat on bushing 97 is shown and disclosed in U.S. application Ser. No. 07/434,097, filed Nov. 9, 1989 entitled "Improved Brush Replacement Means For Shrimp Peeling Device," the inventor being E. Douglas Betts. The details of the brush assembly as disclosed and claimed in said '097 application are incorporated herein by reference.

Belt 100 connects gear 86 and pulley 96 so that when gear 84 is driven by a main gear, not shown, pulley 96 is rotated causing rotation of the brush means.

Figure 9:
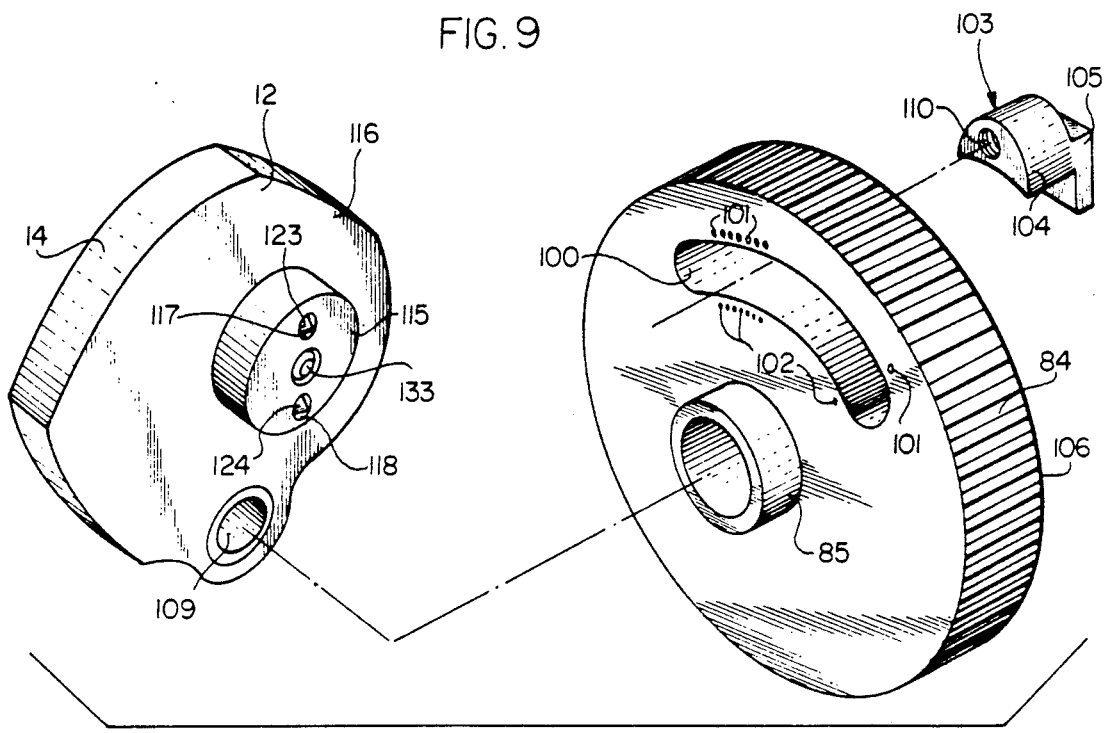
FIG. 9 shows a perspective view of the cam, retention gear and free-floating retention member or retainer, the latter being adapted to seat within an arcuate slot in said retention gear.

Retention gear 84, as seen more clearly, for example, in FIG. 9, includes an arcuate-shaped slot 100 having a plurality of detents 101, 102 spaced above and below slot 100. A free-floating slot insert retention member 103 is adapted to be disposed in slot 100. REtention member 103 comprises a body 104 having a depending leg 105. Body 104 can be of any shape so long as it is free to float or otherwise move freely along the length of slot 100. Leg 105 is adapted to be slidably seated between side 106 of gear 84 and recess 107 in gear 86.

Gears 84, 86 and arm 92 are seated along the length of shaft 80 as shown, for example, in FIG. 5, 6. One end of shaft 80 has a reduced diameter section 108, FIGS. 6, 10, adapted to receive opening 109 of cam 12. Suitable lock washers 111 serve to retain gear 84 and cam member 12 on shaft 80. The reduced diameter portion 108 extends along the length of shaft 80 a suitable distance and is of a length which is approximately double the width of cam 12.

Figure 10:
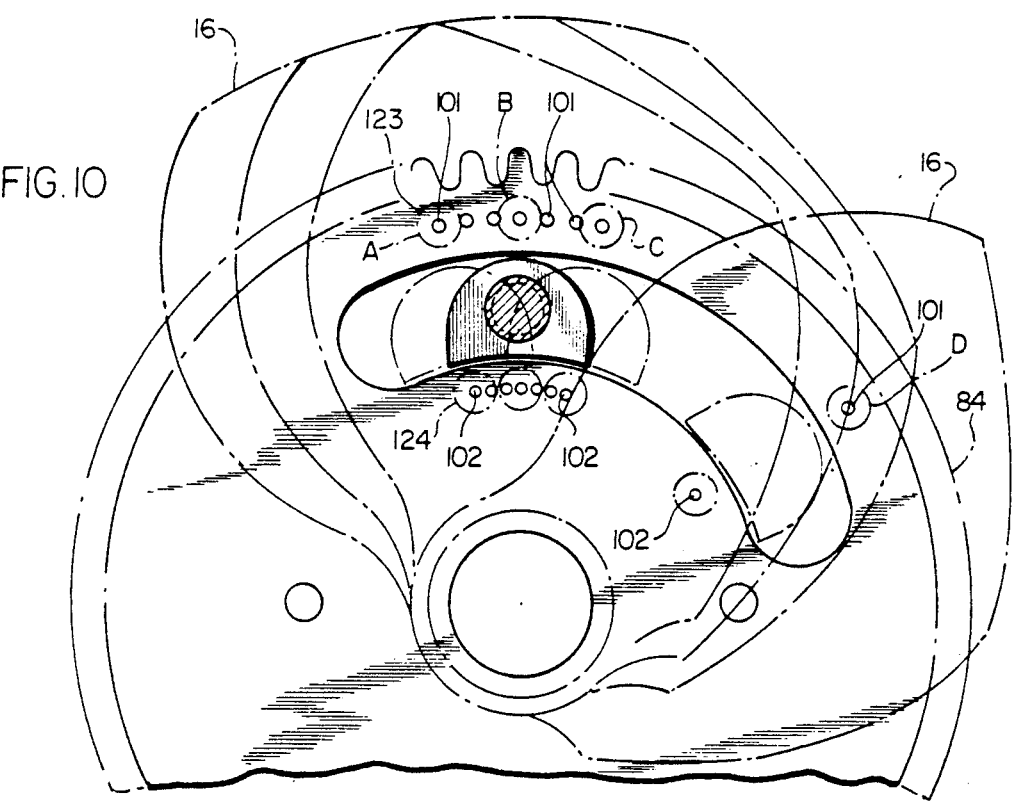
FIG. 10 shows a fragmentary, section view taken along lines 10—10 in FIG. 7 showing a sequence of locations in which the cam is adjusted relative to the slot in the retention gear to provide varying paths for a cam follower assembly to which a cutter blade is attached, resulting in different entry points of the cutter blade into a shrimp located in a clamp assembly.

Cam 12 also includes boss 115 integrally connected to cam side 116. Boss 115 has a pair of spaced threaded openings 117, 118 and opening 119 located between the spaced openings. Openings 117, 118 extend entirely through cam member 12 whereas, as seen in FIGS. 9 and 10, opening 119 is interrupted by a smaller opening 120 to form compartments 121, 122. Set screws 123, 124 are threaded into openings 117, 118, the outboard end of each screw having a conical-shaped head adapted to seat in corresponding shaped detents 101, 102 in gear 84. A spring biasing means 127 comprising a compression spring member is disposed in compartment 122.

Cam 12 is adapted to be pivotally mounted on portion 108 of shaft 80. Cam 12 is releasably fixed in position by handle member 130 which locks cam 12 in fixed position relative to gear 84. Handle member 130 includes shaft 131 having a first portion 132 and a second threaded portion 133, which is larger in diameter than first portion 132. Compression spring 127 seats on handle shaft portion 132. A handle grip 134, having a thickness and width about one fourth of its length, is seated onto shaft 131 and is locked in position by pin 136. Washers 137, 138 are disposed between handle grip 134 and spring means 127.

Figure 2:
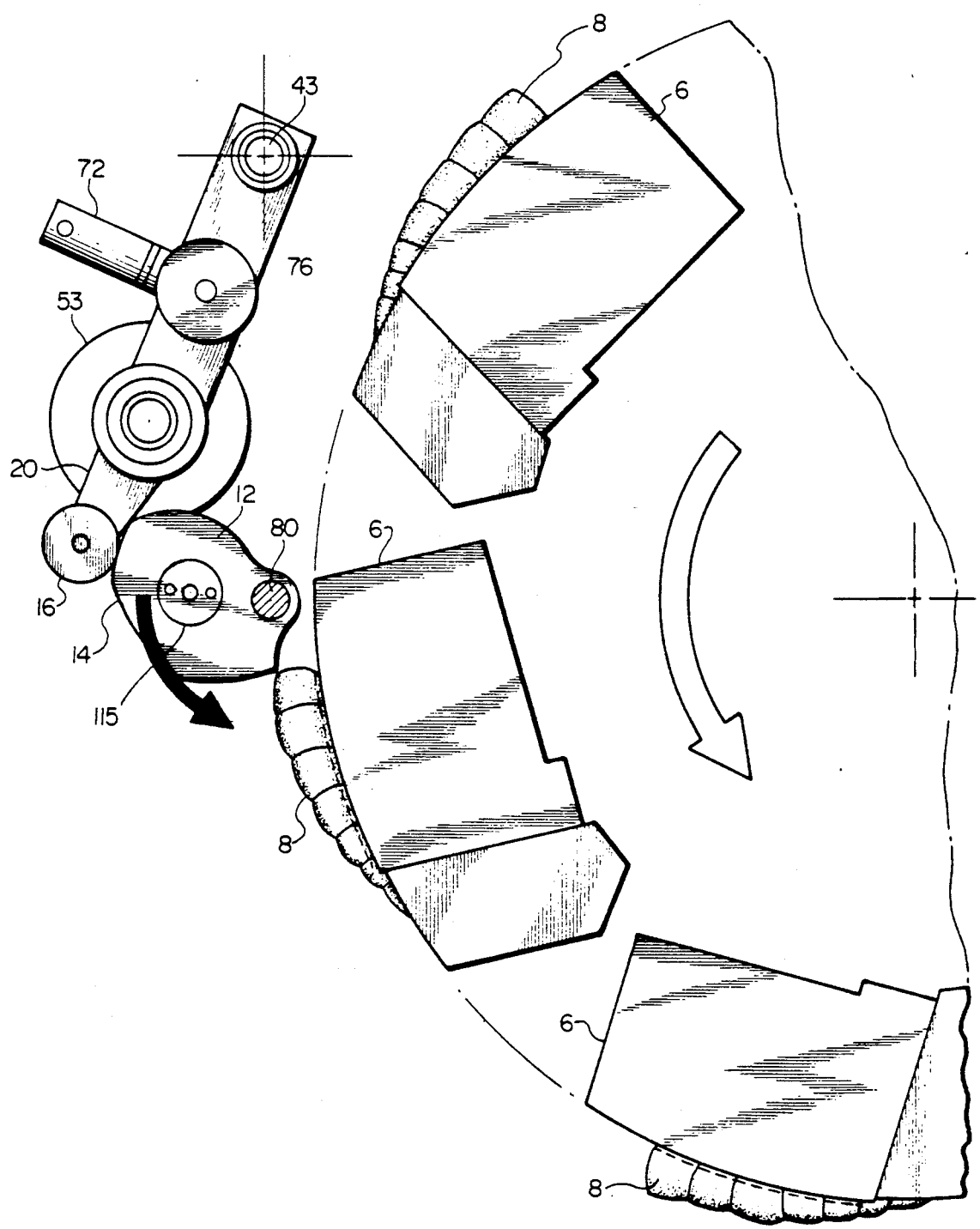
FIG. 2 shows a fragmentary view of the shrimp cutter blade assembly of FIG. 1 with the blade being positioned away from the rotatable turret wheel.
Figure 3:
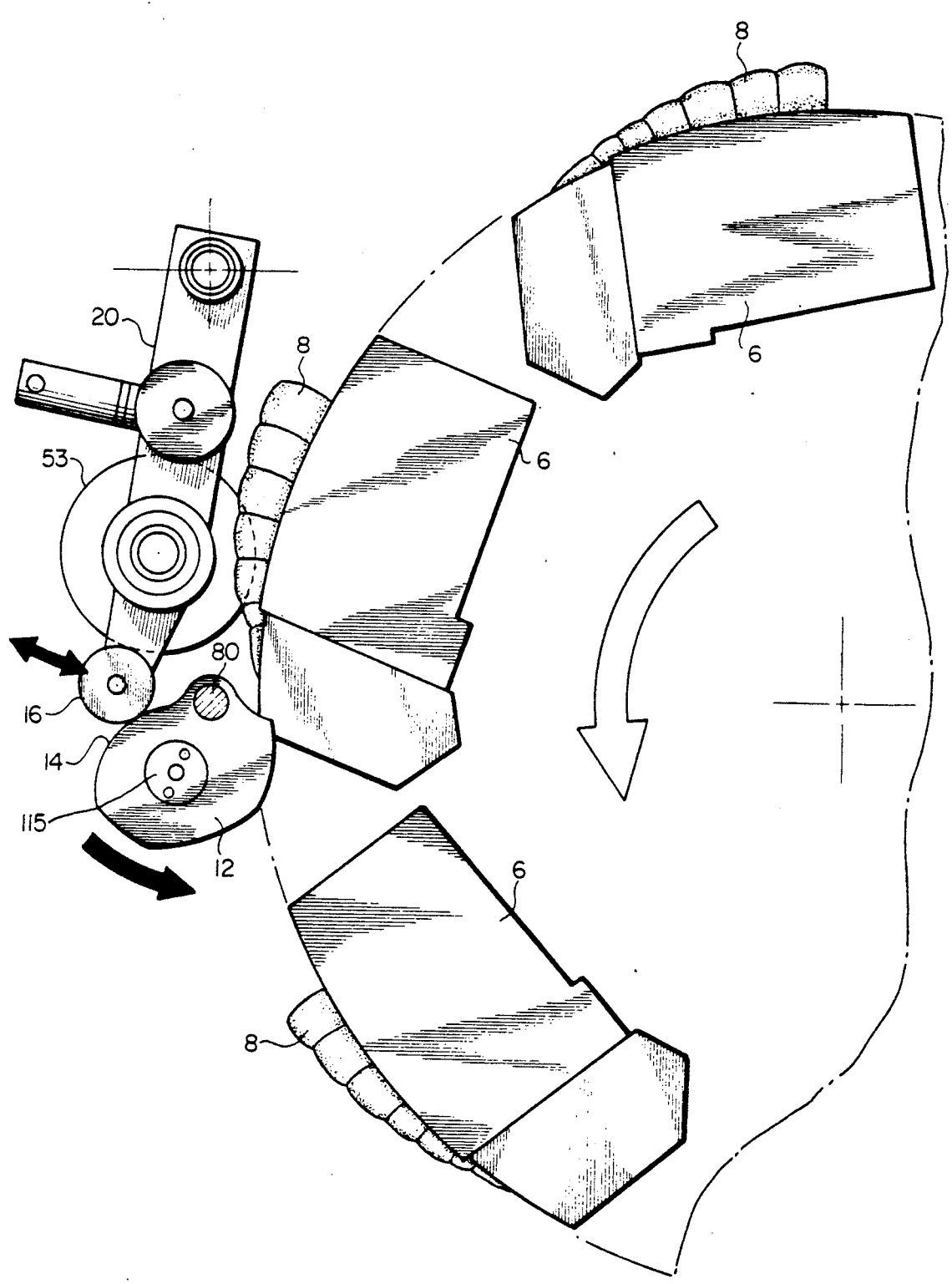
FIG. 3 shows a fragmentary view of the shrimp cutter blade assembly of FIG. 2 with the cam being rotated to another position from the position shown in FIG. 2 whereby the cutter blade is adapted to move toward a shrimp maintained in a clamp assembly.
Figure 4:
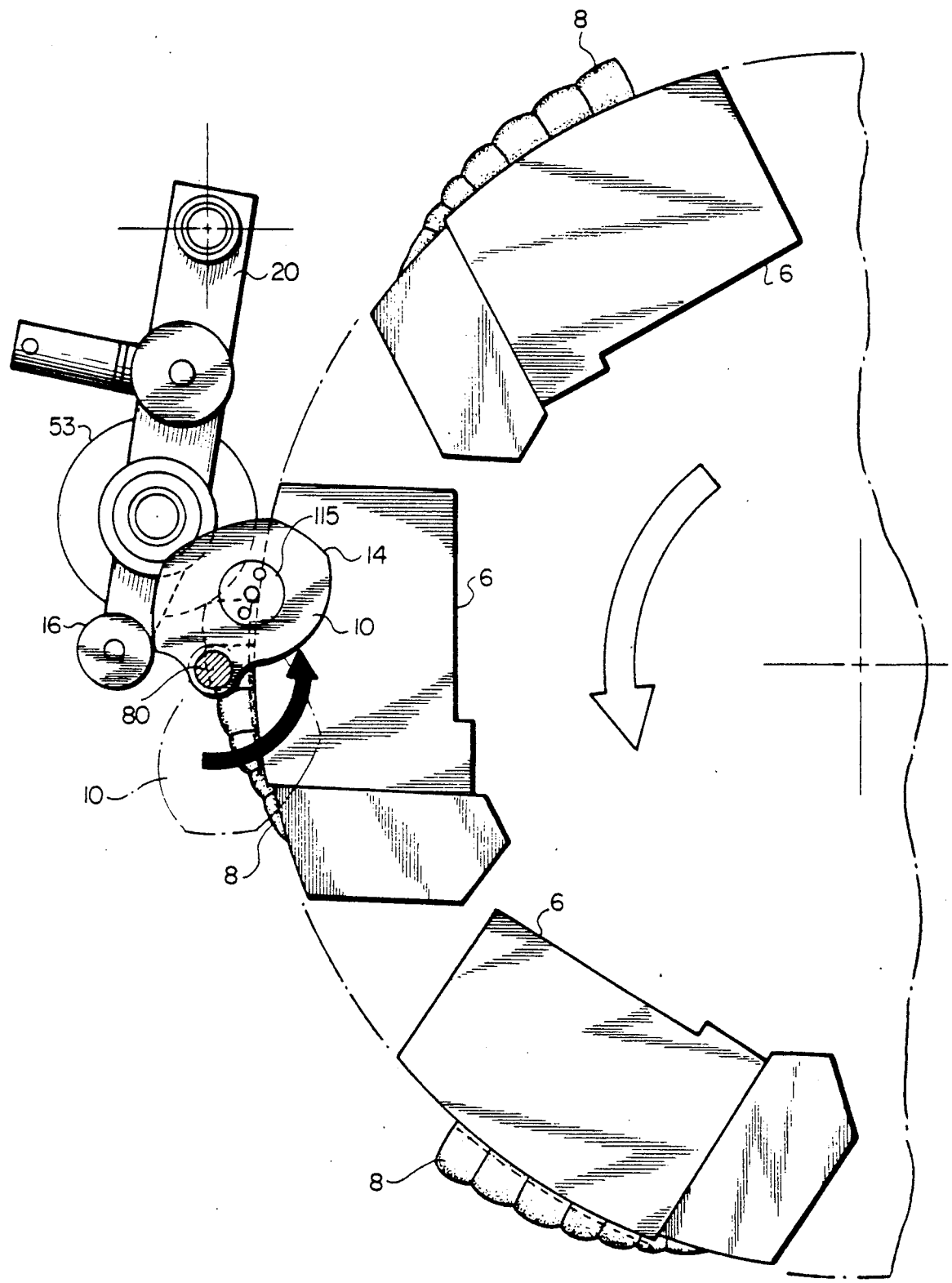
FIG. 4 shows a fragmentary view of the shrimp cutter blade assembly of FIGS. 2 and 3 after a shrimp disposed on a rotatable turret wheel has passed the cutter blade. This figure further illustrates in dotted lines the inactive or inoperative position of the cam when it is disengaged from the free-floating retention member.

Cam 12 has a cam path surface 14 upon which cam follower 16 normally seats when the cam is cutting a shrimp in a "tail-on" position. As cam 12 rotates with gear 84, cam follower 16 moves inward and outward relative to clamp assembly 6 and cutter blade 53 follows the path of follower 16. FIGS. 2-4 illustrate the relationship of cam 12, cam follower 16 and cutter blade 53 relative to a shrimp 8. FIG. 2 shows that, as cam 12, fixed to gear 84, rotates about shaft 80, cam follower 16 is on a high point of cam surface 14 whereby cutter blade 53 is held away from the turret wheel between adjacent clamp assemblies 6. FIG. 3 shows cam 12 on a lower cam surface path than the path in FIG. 2 whereby knife blade 53 is adapted to enter shrimp 8 just after the tail has passed the knife blade as is desired for a "tail-on" style shrimp.

FIG. 4 shows cam follower 16 resting against another high portion of cam surface 14 whereby the knife blade 53 commences to move away from the rotatable turret wheel to the position shown in FIG. 2 whereby the knife blade is spaced from the turret wheel between adjacent clamp assemblies 6.

Figure 8:
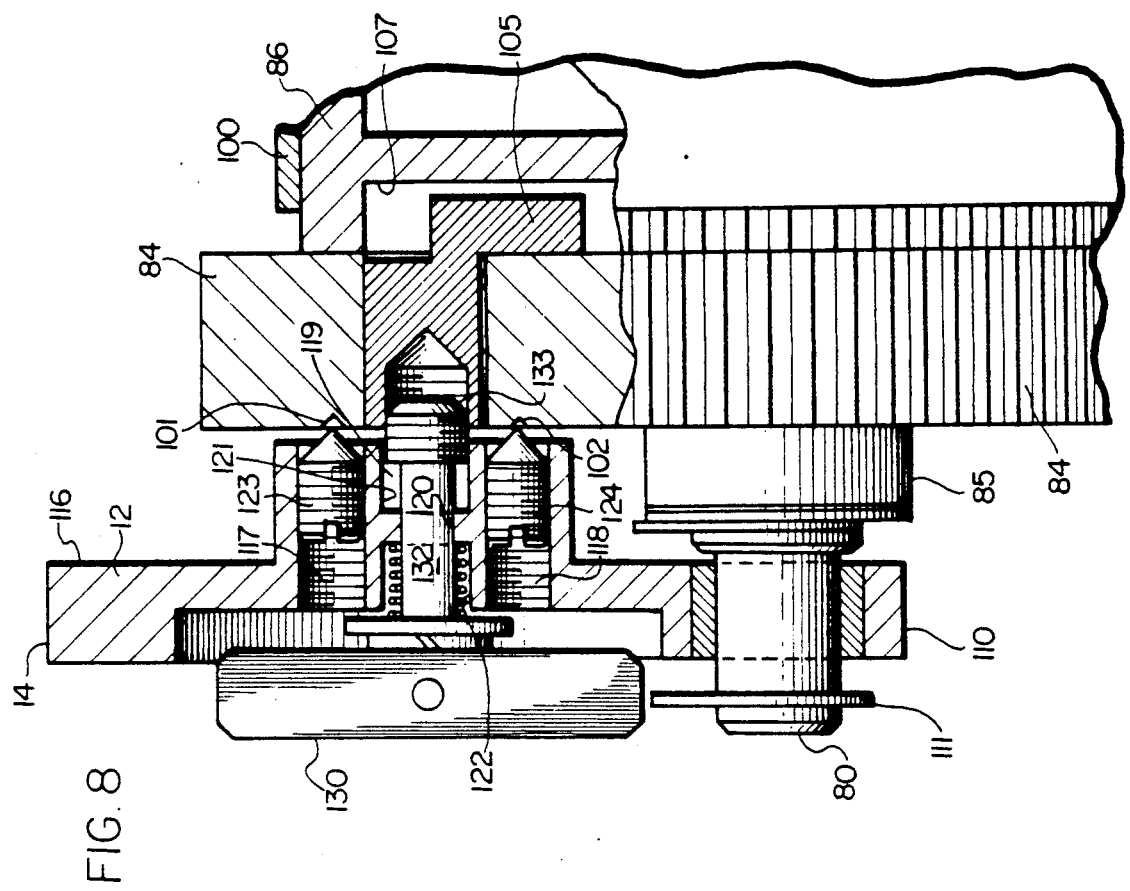
FIG. 8 shows the enlarged, partial front section view of the cam adjusting device of FIG. 7 with the cam member partially disengaged from the rotatable retention gear and retention member with the cam being adapted to rotate to the right most cam position shown in outline in FIG. 10.
Figure 7:
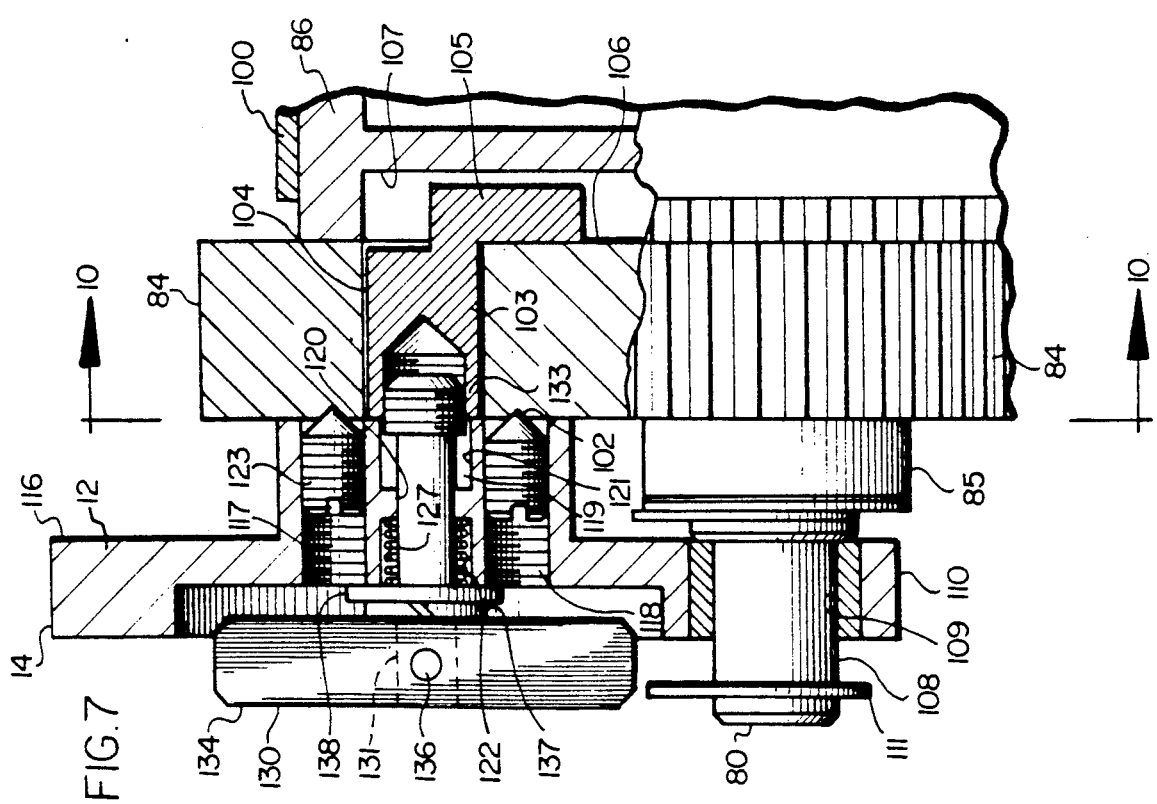
FIG. 7 shows an enlarged, partial front section view of the cam adjusting device of FIG. 6 with the cam member locked to a rotatable retention gear.
Figure 12:
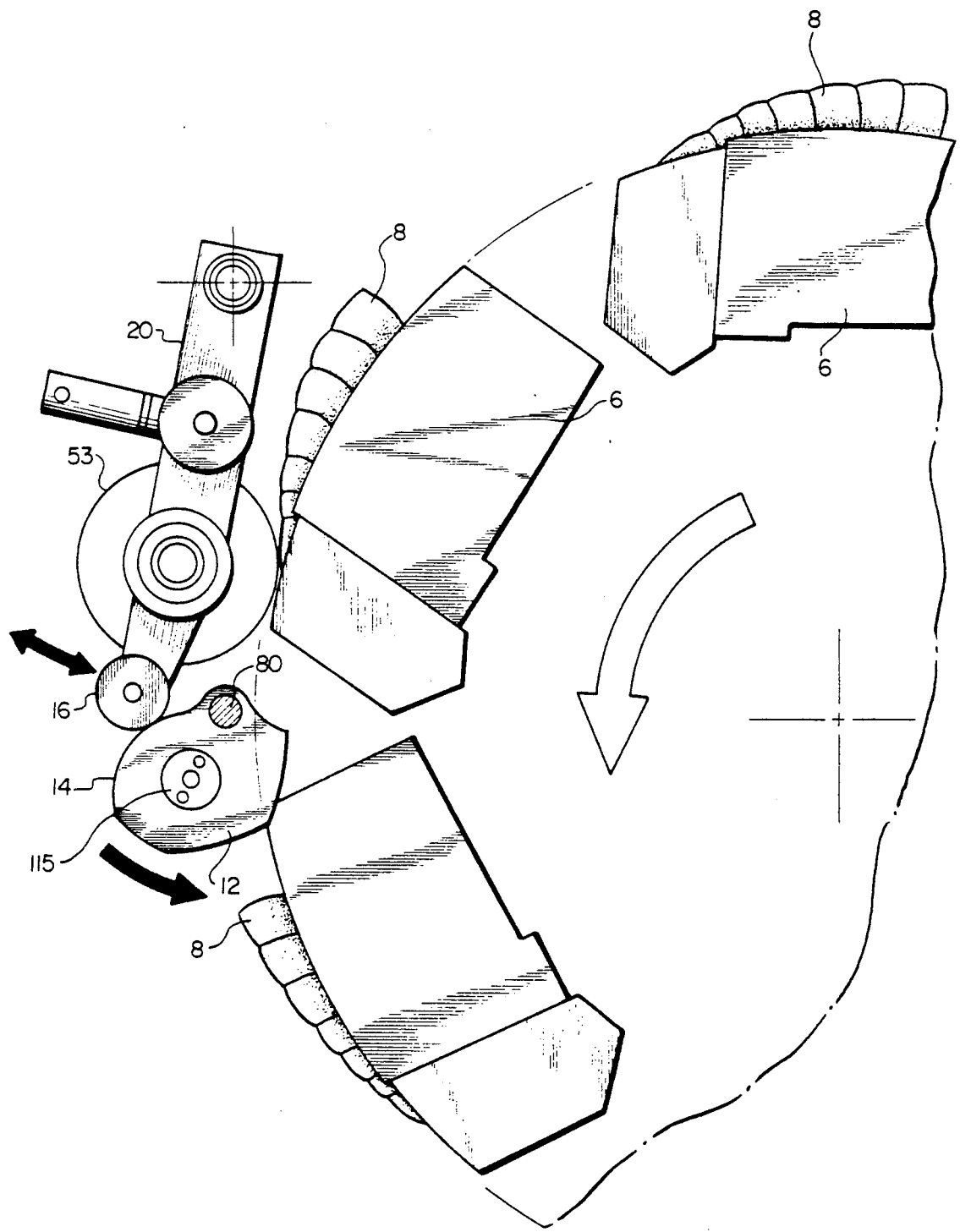

If a "tail-off" style shrimp is desired, an operator turns handle 134 to loosen the threaded portion 133 from the threaded opening 110 in retention member body 104. Upon release, cam 12 can be biased away from the side of retention gear 84 unseating the set screws 123, 124 from detents 101, 102 as shown in FIG. 8. Upon release of cam 12 from gear 84, cam 12 and the free floating retention member 103 are moved in slot 100 to position D shown in FIG. 10. Handle 134 then is tightened and portion 133 is threaded into body opening 110 in retention member 103. The cam 12 is securely held in position D by set screws 123, 124 which seat in detents 101, 102. FIG. 12 shows that with cam 12 adjusted to position D in FIG. 10, cam follower 16 is on the same lower cam surface as FIG. 3 sufficiently before clamp assembly 6 arrives at the cutting station whereby knife blade 53 is adapted to enter shrimp 8 just before the tail. In this position, knife blade 53 cuts the shrimp 8 along its entire length which is desired for a "tail-off" style shrimp.

Figure 11:
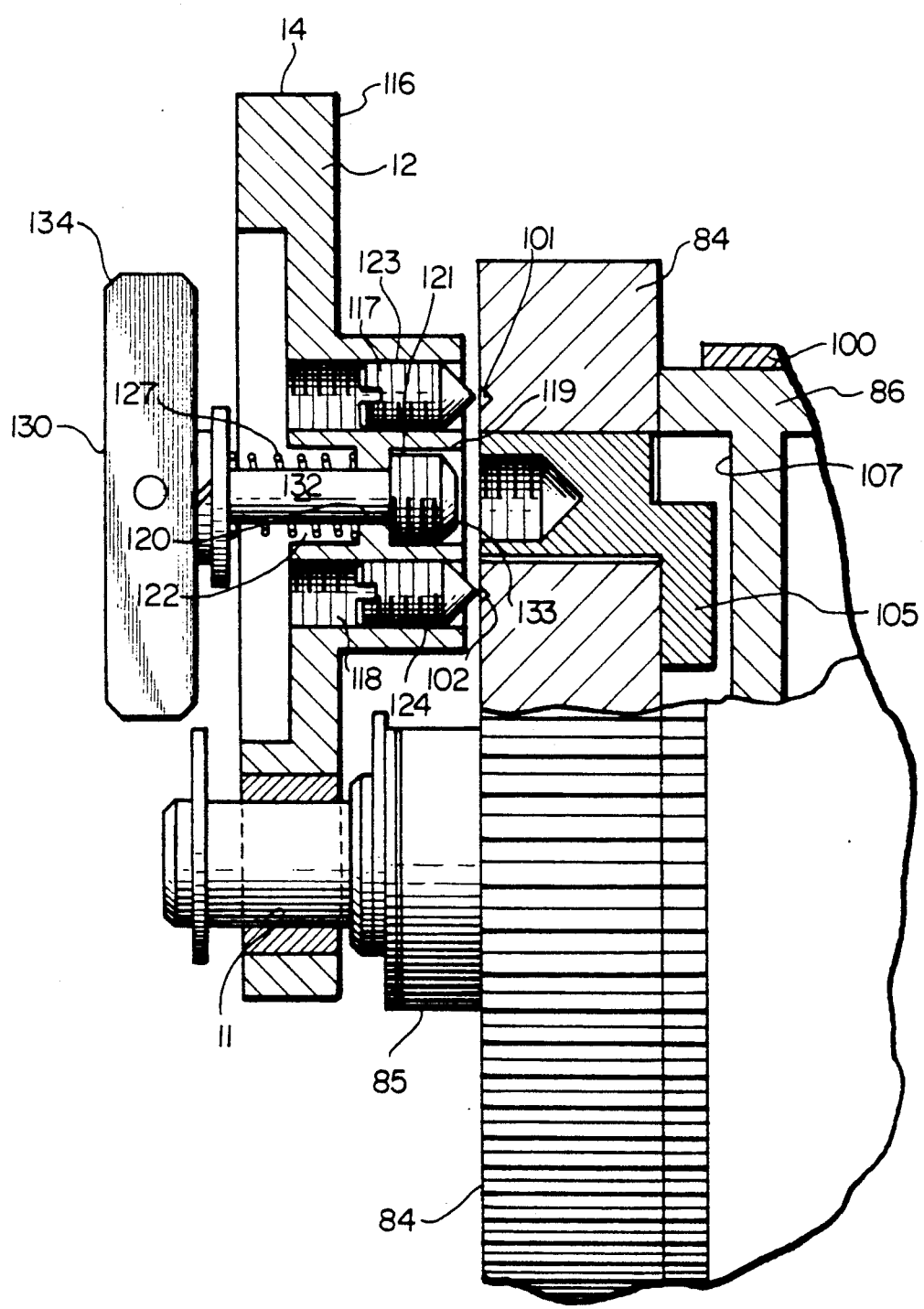
FIG. 11 shows the enlarged, partial front section view of the cam adjusting device of FIG. 8 with the cam member completely disengaged from the rotatable retention gear and retention member with the cam being adapted to rotate to the lower cam position shown in outline in FIG. 4; and, FIG. 12 shows a fragmentary view of the shrimp cutter blade assembly of FIG. 3 with the cam being rotated to another position from the position shown in FIG. 3 whereby the cutter blade is adapted to move toward the rotating turret wheel before a shrimp has reached the cutting station.

If a "tail-off" style shrimp is desired for a full day or several full days of processing, an operator may turn handle 134 to remove the threaded portion 133 from threaded opening 110 in retention member body 104. Upon release, cam 12 is biased away from the side of retention gear 84 as shown in FIG. 11. Upon release of cam 12 from gear 84, cam 12 falls downward as shown in dotted lines in FIG. 4 and cam follower 16 is disengaged from cam 12 whereby pivotable arm 20 does not move unnecessarily so that knife blade 53 remains in the same position relative to the turret wheel. In this position, knife blade 53 cuts a shrimp 8 along its entire length which is desired for a "tail-off" style shrimp.

It is appreciated that adjustment of the cam and thus the knife blade 53 is desired for shrimp of different sizes. To achieve the desired adjustment, an operator releases handle grip 134. Cam 12 and the free-floating retention member 103 are moved to a desired location in slot 100 as, for example, position A, B or C in FIG. 10, whereupon handle 134 is tightened and portion 133 is threaded into body opening 110 in retention member 103 while set screws 117, 118 seat in detents 101, 102. As the handle is tightened, cam 12 is drawn into a fixed position relative to gear 84 and the desired adjustment is made for cutting blade 53 relative to the rotatable turret wheel.

The adjustment is relatively easy for an operator to accomplish. It can be completed in a relatively short period of time; and, the system is not too complex and is readily understandable by most operators.

While one or more embodiments of the invention have been herein illustrated and described in detail, it will be understood that modifications and variation thereof may be effected without departing from the spirit of the invention and the scope of the appended claims.

We claim:

1. A shrimp peeling machine comprising:
a clamp means for holding a shrimp;
a knife assembly positioned relative to said clamp means;
said knife assembly including a pivotable arm member;
a knife means disposed on said arm for cutting a shrimp shell and meat; and, a cam follower connected to said arm;
a rotatable member;
a cam releasably fixed to said rotatable member and having a cam surface adapted to be contacted by said cam follower to generate a cam path; and
means disposed on said rotatable member and cam for adjustably positioning said cam on said rotatable member to alter said cam path relative to said rotatable member whereby said knife means will move in a direction toward or away from said clamp assembly as said cam follows said cam path.

2. A shrimp peeling machine in accordance with claim 1 wherein said rotatable member includes:
a slot;
a retention member disposed for movement in said slot; and,
fastening means connecting said cam to said retention member to releasably position said cam in a selected position on said gear.

3. A shrimp peeling machine in accordance with claim 2 and further including:
a shaft means;
said cam and rotatable member being disposed on said shaft whereby said cam is pivotable about said shaft; and,
said cam being adapted to rotate about said shaft to an inoperative position whereby it is free of contact with said cam follower when said fastening means disconnects said cam from said retention member.

4. A shrimp peeling machine in accordance with claim 3 wherein said fastening means is biased such that upon disconnection of said cam from said retention member, said cam moves along the longitudinal axis of said shaft and pivots to an inoperative position.

5. A shrimp peeling machine in accordance with claim 4 wherein said retention member includes a retention member body and a leg depending from said body, said leg being positioned contiguous to a side of said rotatable member.

6. A shrimp peeling machine in accordance with claim 5.

7. A shrimp peeling machine in accordance with claim 6 wherein said detents are disposed above and below said slot.

8. A shrimp peeling machine in accordance with claims 1-7 in which said rotatable member is a gear.

9. A shrimp peeling machine for cutting a shrimp comprising:
at least one clamp means for holding a shrimp;
a knife assembly positioned relative to said clamp means;
said knife assembly including a pivotable arm member;
a knife means disposed on said arm member;
a cam follower disposed on said arm member;
a rotatable gear member adapted to be driven;
said gear member having a slot therein;
a retention member disposed for movement within said slot;

a cam having a cam surface adapted to contact said cam follower;

said cam being adapted to contact one side of said rotatable gear member in the area of said slot; and, fastening means for releasably connecting said cam to said retention member whereby said cam is positioned at a desired location along the length of said slot.

10. A shrimp peeling machine in accordance with claim 9 wherein said fastening means includes a spring means to normally bias said fastening means away from said gear member.

11. A shrimp peeling machine in accordance with claim 10 and further including a shaft;

said rotatable gear being fixed to said shaft;

said cam having a shaft opening disposed therein to receive said shaft whereby said cam is pivotable about said shaft when said fastening means are free of connection to said retention member.

12. A shrimp peeling machine in accordance with claim 11 wherein said cam includes a boss extending outward from a side of said cam, said boss contacting said gear member when said fastening means is connected to said retention member.

13. A shrimp peeling machine in accordance with claim 12 wherein said boss includes at least one threaded opening extending throughout the width of said cam;

a cam fastener opening disposed contiguous to said threaded opening;

said gear member having a plurality of detents located adjacent and along the length of said slots;

a screw means disposed in said threaded opening having an end thereof adapted to coact with each of said detents on said gear member; and, said fastening means extending through said cam fastener opening.

14. A shrimp peeling machine in accordance with claim 13 wherein said fastening means includes a shaft comprising a first and second portion;

said fastening means shaft extending through the width of said cam member;

a handle grip disposed on one end of said fastening means shaft and said remaining end being threaded along a portion of the length of said fastening means shaft;

said retention member comprising a retention body having a threaded opening therein;

said threaded portion of said fastening means shaft being adapted to engage said threaded opening in said retention body; and, said fastening means shaft having a biasing means disposed thereon for biasing said fastening means shaft normally away from said retention body and gear member.

15. A shrimp peeling machine comprising:

a plurality of shrimp clamping assemblies disposed on a rotatable turret wheel;

a knife assembly for cutting shrimp clamped in said clamp assemblies;

said knife assembly including a pivotable arm member;

a rotary cutting blade connected to said pivotable arm member;

a cam follower attached to said arm member;

a rotatable gear member having a slot therein;

a retention member disposed and movable in said slot;

a cam having a cam surface engageable with said cam follower; and, fastening means for connecting said cam to said retention member at a selected location along the length of said slot whereby the cam path is altered as the cam is moved to a different position along the length of said slot.

16. A shrimp peeling machine in accordance with claim 15 wherein said cam includes a shaft opening;

a shaft extending through said cam member and said gear; said cam being pivotable about said shaft; and, said fastening means including a biasing means to normally urge said fastening means away from said gear when said fastening means is disengaged from said retention member.

17. A shrimp peeling machine in accordance with claim 15 wherein said cam includes a boss integral with and extending outwardly from the side of said cam;

said boss being situated contiguous to said retention member;

said boss having a pair of spaced threaded openings;

locating means adapted to be threaded in said openings;

said rotatable gear having a plurality of spaced detents disposed therein adjacent said slot;

said threaded locating means having a shape adapted to mate with said detents.

18. A shrimp peeling machine in accordance with claim 17 wherein said retention member includes a body having a threaded opening to receive said fastening means; and, a retention leg depending from said retention body.

19. A shrimp peeling machine in accordance with claim 15 wherein said slot is arcuate-shaped.

20. A shrimp peeling machine in accordance with claim 15 and further including a second rotatable gear disposed contiguous to said first rotatable gear, said retention member being disposed between said first and second gears.

21. A cutter blade adjustment for a shrimp peeling device having a pivotable arm, a shrimp cutter blade attached to said arm and a cam follower attached to said arm, said adjustment assembly comprising:

a rotatable member;

a cam releasably fixed to said rotatable member and having a cam surface adapted to be contacted by said cam follower to generate a cam path; and, means disposed on said rotatable member and cam for adjustably positioning said cam on said rotatable member to alter said cam path relative to said rotatable member whereby said cutter blade will move in a direction toward or away from said clamp assembly as said cam follows said cam path.

22. A cutter blade adjustment assembly in accordance with claim 21 wherein said rotatable member includes:

a slot;

a retention member disposed for movement in said slot; and, fastening means connecting said cam to said retention member to releasably position said cam in a selected position on said gear.

23. A cutter blade adjustment assembly in accordance with claim 22 and further including:

a shaft means;

said cam and rotatable member being disposed on said shaft whereby said cam is pivotable about said shaft; and said cam being adapted to rotate about said shaft to an inoperative position whereby it is free of contact with said cam follower when said fastening means disconnects said cam from said retention member.

24. A cutter blade adjustment assembly in accordance with claim 23 wherein said fastening means is biased such that upon disconnection of said cam from said retention member, said cam moves along the longitudinal axis of said shaft and pivots to an inoperative position.

25. A cutter blade assembly in accordance with claim 24 wherein said retention member includes a body, said leg being positioned contiguous to a side of said rotatable member.

26. A cutter blade assembly in accordance with claim 25 wherein said rotatable member includes a plurality of detents disposed contiguous to said slot; and,
   said fastening means includes an engaging means for engaging said detents to assist in locking said cam in position relative to said rotatable member.

27. A cutter blade assembly in accordance with claim 26 wherein said detents are disposed above and below said slot.

28. A cutter blade assembly in accordance with claims 21-27 in which said rotatable member is a gear.

* * * * *

UNITED STATES PATENT AND TRADEMARK OFFICE
CERTIFICATE OF CORRECTION

PATENT NO. : 5,035,669
DATED : July 30, 1991
INVENTOR(S) : Edmund D. Betts It is certified that error appears in the above-identified patent and that said Letters Patent is hereby corrected as shown below:

Col. 2, l. 22, delete "provided" and insert --provide--;

Col. 2, l. 52, replace the "I" in the word "FInally" with --i--;

Col. 4, l. 31, delete the space between "fragmentary" and the ",";

Col. 4, l. 55, delete "112" and insert --12--;

Col. 5, l. 23, delete "now" and insert --not--;

Col. 5, l. 57, delete "or" and insert --of--;

Col. 6, l. 8, insert a space and comma between "1989" and "entitled";

Col. 6, l. 27, delete "FIG." and insert --FIGS.--;

Col. 7, l. 65, delete "variation" and insert --variations--;

UNITED STATES PATENT AND TRADEMARK OFFICE
CERTIFICATE OF CORRECTION

PATENT NO. : 5,035,669
DATED : July 30, 1991
INVENTOR(S) : Edmund D. Betts It is certified that error appears in the above-identified patent and that said Letters Patent is hereby corrected as shown below:

Col. 11, l. 14, following the word "a", insert --retention member--;

Col. 11, l. 14, following the word "body", insert --and a leg depending from said body--".

Signed and Sealed this

Twenty-second Day of December, 1992

*Attest:*

DOUGLAS B. COMER

*Attesting Officer*          Acting Commissioner of Patents and Trademarks